US008185276B2

(12) United States Patent
Buckbee et al.

(10) Patent No.: US 8,185,276 B2
(45) Date of Patent: May 22, 2012

(54) PROGRAMMABLE WIRELESS REMOTE CONTROL SYSTEM AND METHOD FOR SNOW PLOWS

(75) Inventors: Mark D. Buckbee, Wauwatosa, WI (US); Mike M. Stevens, Cedarburg, WI (US); Michael L. Schultz, Lomira, WI (US)

(73) Assignee: Sno-Way International, Inc., Hartford, WI (US)

( * ) Notice: Subject to any disclaimer, the term of this patent is extended or adjusted under 35 U.S.C. 154(b) by 1009 days.

(21) Appl. No.: 12/140,466

(22) Filed: Jun. 17, 2008

(65) Prior Publication Data

US 2009/0309779 A1 Dec. 17, 2009

(51) Int. Cl.
*E01H 5/00* (2006.01)
*G06F 7/00* (2006.01)

(52) U.S. Cl. .................. 701/50; 701/2; 701/36; 37/196; 37/234; 37/235

(58) Field of Classification Search .................... 37/196, 37/197, 234, 235, 236; 701/2, 36, 50; 702/114, 702/184, 185

See application file for complete search history.

(56) References Cited

U.S. PATENT DOCUMENTS

| | | | | |
|---|---|---|---|---|
| 5,864,783 | A | 1/1999 | Struck et al. | |
| 6,081,770 | A | 6/2000 | Struck et al. | |
| 6,163,985 | A | 12/2000 | Chinnery et al. | |
| 6,351,722 | B1 | 2/2002 | Struck et al. | |
| 6,467,199 | B1 | 10/2002 | Christy | |
| 6,643,601 | B1 | 11/2003 | Struck et al. | |
| 6,778,932 | B2 | 8/2004 | Struck et al. | |
| RE38,665 | E | 12/2004 | Struck et al. | |
| 6,852,934 | B1 | 2/2005 | Lashua | |
| 2010/0006666 | A1 * | 1/2010 | Kendall et al. | 239/11 |
| 2010/0175282 | A1 * | 7/2010 | Menze | 37/234 |

* cited by examiner

*Primary Examiner* — Lesley D. Morris
*Assistant Examiner* — Marc Scharich
(74) *Attorney, Agent, or Firm* — Reinhart Boerner Van Deuren s.c.

(57) ABSTRACT

A control system and method for operating a snow plow is disclosed which utilizes a programmable, wireless remote control for providing fully functional operation of a snow plow blade mounted on a vehicle. The system includes a remote control that can be used to operate both a snow plow and a spreader, with the system being configurable to work with any of a variety of different snow plows. The remote control may be programmed to perform a series of functions that can be sequentially performed by pressing a single button on the remote control.

36 Claims, 10 Drawing Sheets

PROGRAMMABLE WIRELESS REMOTE CONTROL SYSTEM AND METHOD FOR SNOW PLOWS

BACKGROUND OF THE INVENTION

Field of the Invention

The present invention relates generally to controls for operating snow plows, and more particularly to a programmable wireless remote control system and method for providing fully functional operation of a snow plow blade mounted on a vehicle.

Snow plows have been available as an accessory for light and medium duty trucks for some time. Most snow plows are removably installed onto the front end of a truck, with the operation of most truck-installed snow plow being controlled by a self-contained hydraulic system that is capably of at least raising and lowering the snow plow blade and orienting it in a desired orientation to control the displacement of snow by the snow plow blade. Hydraulically-controlled snow plows are operated by electric control systems that operate relays controlling the flow of hydraulic fluid in the snow plow hydraulic system to operate the snow plow blade.

This electrical actuation of the snow plow hydraulic system of the snow plow to manipulate the snow plow blade is controlled with a remote control typically including a number of switches that is located in the cab of the truck. Most such remote controls are electrically connected with the hydraulic system of the snow plow by running wires from the remote control in the truck cab to the relays on the hydraulic system of the snow plow. The wires are typically run through the dashboard, the firewall, the engine compartment, and the front grill of the truck. Between the truck and the snow plow, the wires have engaging plugs to allow the snow plow to be removed from the truck.

Such snow plow control systems have a number of disadvantages, not the least of which is the amount of labor required to install the wiring and remote control in a truck to which a snow plow will be removably attached. Since such wired remote controls are typically left in the truck even when the snow plow has been removed from the truck, the remote control can be in the way of the operator or interfere with access to other vehicle controls while serving no useful purpose. Even more significantly, the operator of the snow plow can only operate the controls of the snow plow while he or she is located within the truck cab. Some snow plows may be used on more than one truck, requiring the purchase and installation of multiple remote controls and wiring for multiple trucks.

A significant improvement in remote controls for snow plows is taught in U.S. Pat. No. RE38,665, to Struck et al., which patent is assigned to the assignee of the present patent application, and which patent is hereby incorporated herein in its entirety. The Struck et al. patent teaches a wireless remote control system for operating the snow plow hydraulic system to operate the snow plow blade, with a receiver being permanently mounted on the snow plow and a wireless transmitter being useable either in the cab of the truck or outside the truck cab in proximity to receiver on the snow plow. The remote control system of the Struck et al. patent is capable of operating the snow plow to raise, lower, and pivot the snow plow blade.

Another accessory that has been available for light and medium duty trucks for some time is a spreader for spreading salt and/or sand in many areas during the winter months for maintaining roads and driveways. While various types of spreader units have been developed for spreading dry, free flow materials, such as salt and sand, the most common salt spreader units are those that are designed for mounting at the back of vehicles such as light and medium duty trucks. Like the snow plows discussed above, since such salt spreader units are not used year round, the salt spreader units are removably mounted at the back of the truck, either on the tailgate or, for larger units, in the bed of the truck.

Such spreader units includes a hopper for containing a supply of salt, and have a discharge outlet at the back of the truck and near the bottom of the spreader unit through which salt falls onto a spinner. Typically, the spinner is mounted on a drive shaft which is rotated by an electric motor, the speed of which is controllable by the driver of the vehicle to change the range over which the particulate material is distributed. The operation of such spreader units is controlled by a remote control that is, like the remote control of the plow, located in the cab of the truck. The spreader remote controls is electrically connected to the spreader unit by running wires from the spreader remote control in the truck cab to the spreader at the back of the truck. These wires must be run through the back of the cab into the bed of the truck, and then to the spreader unit. They may or may not have engaging plugs to allow the spreader unit to be removed from the truck.

A significant improvement in remote controls for spreaders is taught in U.S. Pat. No. 6,702,208, to Hadler et al., which patent is also assigned to the assignee of the present patent application, and which patent is hereby incorporated herein in its entirety. The Hadler et al. patent, which is directed toward a spreader unit that may be mounted on a skid steer loader unit, teaches a wireless remote control system for operating the spreader unit, with a wireless receiver being mounted on the spreader flow controller and a wireless control unit being useable either in the cab of the skid steer loader unit or outside the cab in proximity to the wireless receiver. The remote control system of the Hadler et al. patent is capable of operating the spreader unit to start, stop, and vary the flow rate of material dispensed by the spreader unit.

It is the primary objective of the system and method disclosed herein to provide an improved programmable wireless remote control system and method for controlling a snow plow. It is a further objective that the programmable wireless remote control system and method be capable of working with any one of a plurality of different types of snow plows, even though different snow plows have different configurations and generally require different controls having different capabilities. It is a related objective that the programmable wireless remote control system and method be capable of automatically sensing which type of snow plow is connected to the remote control system. It is an additional objective that the programmable wireless remote control system and method also be operable to wirelessly control a spreader unit in addition to controlling a snow plow, and that only a single remote control is required to control both the snow plow and the spreader unit.

It is another objective that the programmable wireless remote control system and method provide diagnostics to monitor important functions of a snow plow and/or a spreader unit, and that the remote control function to inform a user of the occurrence of any of such monitored faults. It is still another objective that the programmable wireless remote control system and method provide the capability of macros to run customized programs upon the actuation of a single button, and that the user of the programmable wireless remote control system and method be capable of programming such customized programs. It is a further objective of the programmable wireless remote control system and method that it provide a job timer to enable users who are professional snow plow operators who bill on the basis of time spent to easily track the amount of time spent performing a job.

The programmable wireless remote control system disclosed herein must also be of construction which is both durable and long lasting, and it should also require little or no maintenance to be provided by the user throughout its operating lifetime. In order to enhance the market appeal of the programmable wireless remote control system and method disclosed herein, it should also be of inexpensive construction to thereby afford it the broadest possible market. Finally, it is also an objective that all of the aforesaid advantages and objectives of the programmable wireless remote control system and method be achieved without incurring any substantial relative disadvantage.

SUMMARY OF THE INVENTION

The disadvantages and limitations of the background art discussed above are overcome by the system and method disclosed herein. With this system and method, a remote control system for operating a snow plow uses a battery-powered remote control to wirelessly communicate with a plow controller to operate a snow plow that is mounted onto a vehicle such as a truck. In an exemplary embodiment, the same remote control may also be used to wirelessly communicate with a spreader controller to operate a spreader that is mounted at the rear of the vehicle.

The programmable wireless remote control system and method disclosed herein pairs a particular remote control with a particular snow plow and/or a particular spreader, and thereby prevents communication with other unpaired components. The programmable wireless remote control system is capable of controlling any of a wide variety of snow plows, and as such does not require dedicated controllers for each different type of snow plow. The programmable wireless remote control system operates in a manner such that it is automatically able to detect which type of snow plow it is connected to and configure itself accordingly to control that type of snow plow.

The programmable wireless remote control system and method disclosed herein allows the user to create customized programs of multiple steps, each of which occurs for a particular period of time (referred to herein as macros) that can subsequently be made to run upon the actuation of a single button. The programmable wireless remote control system is capable of automatically detecting a number of different faults, both in the operation of a snow plow and in the operation of a spreader, and displaying a warning message indicative of the occurrence of such faults. The programmable wireless remote control system include both a clock and a job timer, with the job timer being useable to determine the amount of time is taken for a particular plowing service to be performed, a highly useful feature to user providing snow plowing services on a commercial basis.

It may therefore be seen that the present invention teaches an improved programmable wireless remote control system and method for controlling a snow plow. The programmable wireless remote control system and method disclosed herein is capable of working with any one of a plurality of different types of snow plows, even snow plows having different configurations which generally require different controls having different capabilities. The programmable wireless remote control system and method disclosed herein is capable of automatically sensing which type of snow plow is connected to the remote control system and adapting itself to operate the sensed type of snow plow. The programmable wireless remote control system and method disclosed herein is also operable to wirelessly control a spreader unit in addition to controlling a snow plow, with only a single remote control being required to control both the snow plow and the spreader unit.

The programmable wireless remote control system and method disclosed herein provides diagnostics to monitor important functions of a snow plow and/or a spreader unit, with the remote control functioning to inform a user of the occurrence of any of such monitored faults. The programmable wireless remote control system and method disclosed herein are capable of both creating and playing macros that run customized programs upon the actuation of a single button, with the user of the programmable wireless remote control system and method being able to programming such customized programs quickly and easily. The programmable wireless remote control system and method disclosed herein also provide a job timer to enable users who are professional snow plow operators who bill on the basis of time spent to easily track the amount of time spent performing a job.

The programmable wireless remote control system disclosed herein is of a construction which is both durable and long lasting, and which will require little or no maintenance to be provided by the user throughout its operating lifetime. The programmable wireless remote control system disclosed herein is also of relatively inexpensive construction to enhance its market appeal and to thereby afford it the broadest possible market. Finally, all of the aforesaid advantages and objectives of the programmable wireless remote control system and method are achieved without incurring any substantial relative disadvantage.

DESCRIPTION OF THE DRAWINGS

These and other advantages of the present invention are best understood with reference to the drawings, in which.

DETAILED DESCRIPTION OF THE EXEMPLARY EMBODIMENTS

Figure 1:
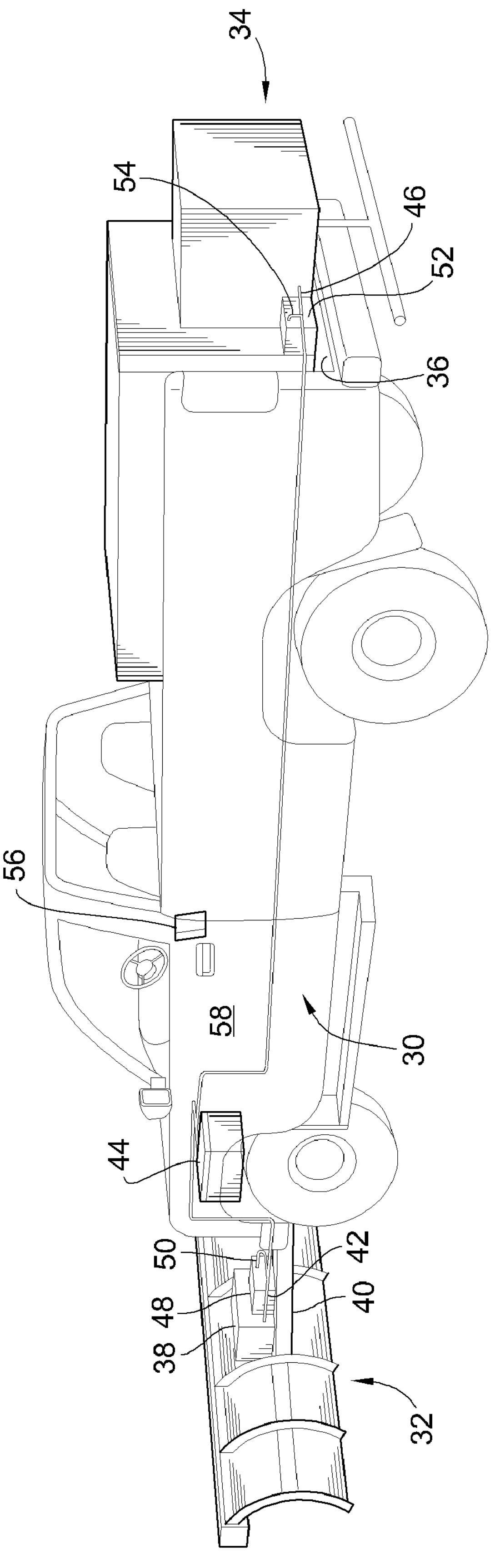
FIG. 1 is a somewhat schematic view of a truck having a snow plow mounted at the front thereof and a salt spreader mounted in the bed of the truck, showing a snow plow controller located on the snow plow and a spreader controller located on the spreader, and a remote control located in the cab of the truck for operating the snow plow controller and the spreader controller.

An exemplary embodiment of the programmable wireless remote control system and method disclosed herein is shown schematically in FIG. 1 installed into a truck 30 having a snow plow 32 mounted at the front thereof, and a spreader unit 34 mounted in the bed 36 of the truck 30 for dispensing salt or the like from the rear of the truck 30. Although the snow plow 32 and the spreader unit 34 are illustrated schematically, it will be understood that the snow plow 32 may be any of a wide variety of snow plows, including both straight blade plows, V-plows, and other types of plows as well (such as plows with actuatable wings).

The snow plow 32 is operated by a hydraulic system 38 that is typically mounted on a snow plow support apparatus 40 that is mounted at the front of the truck 30. Both the hydraulic system 38 and the spreader unit 34 are electrically operated with power from the truck 30, which is schematically illustrated by wiring 42 from a battery 44 in the truck 30 to the hydraulic system 38, and by wiring 46 from the battery 44 to the spreader unit 34. It will be appreciated by those skilled in the art that the wiring 42 and the wiring 46 is shown schematically only.

A plow controller 48 is shown mounted onto the hydraulic system 38, and is supplied with power from the battery 44 by a wire 50. A spreader controller 52 is shown mounted onto the spreader unit 34, and is supplied with power from the battery 44 by a wire 54. It will be appreciated by those skilled in the art that the wiring 50 and the wiring 54 is shown schematically only. Both the plow controller 48 and the spreader controller 52 are operated by a remote control 56, which is shown as being located in the cab 58 of the truck 30.

Figure 2:
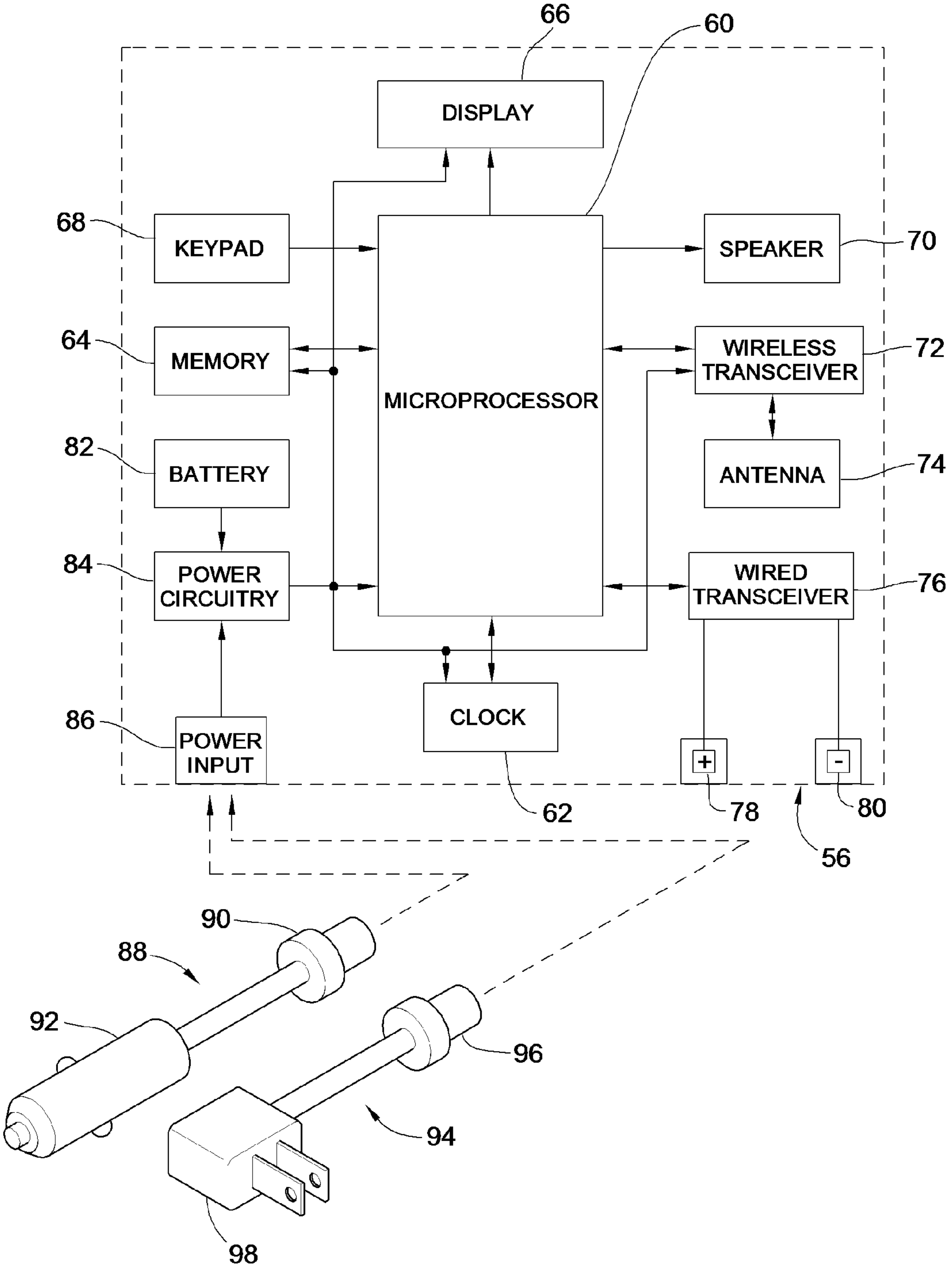
FIG. 2 is a functional schematic diagram of the remote control illustrated in FIG. 1, also showing a cigarette lighter adapter for use in the cab of a truck and an AC adapter for use in a building to recharge the remote controller.

Referring next to FIG. 2, a functional schematic diagram of the remote control 56 is illustrated. The remote control 56 is based upon a microprocessor 60, which is supplied with timing signals from a clock 62. The microprocessor 60 accesses a memory 64, which preferably includes programmable memory. The microprocessor 60 operates a display 66, which may be an eight character, two line display.

The remote control 56 includes a keypad unit 68, which is also connected the microprocessor 60, for providing user input to operate the programmable wireless remote control system and method disclosed herein. The keypad unit 68 may include keys, switches, joysticks, or any other control mechanism desired. The microprocessor 60 also controls sound from a speaker 70, which may include both a speaker and an amplifier to operate the speaker. The speaker 70 may be used to provide audible feedback as the keypad unit 68 is operated, and/or a warning signal upon the occurrence of a fault (which will be discussed below in conjunction with FIG. 8).

The remote control 56 includes a wireless transmitter 72 which is operated by the microprocessor 60 and which is connected to an antenna 74. In a preferred embodiment, the wireless transmitter 72 is a bidirectional digital radio transceiver, which may use the ZigBee communication protocol. Optionally, the remote control 56 may also include a wired transmitter 76 which is also operated by the microprocessor 60 and which is electrically connected to two terminals 78 and 80 that are accessible from the outside of the remote control 56, and that may be used to connect a wire to control the plow controller 48 (shown in FIG. 1) and/or the spreader controller 52 (also shown in FIG. 1). In operation, only one of the wireless transmitter 72 and the wired transmitter 76 will be used in conjunction with a particular vehicle.

The remote control 56 may be operated with power supplied from a battery 82, which is connected to a power circuitry 84. The power circuitry 84 may typically supply electrical power to the microprocessor 60, the clock 62, the memory 64, the display 66, and the wireless transmitter 72, although it also provides the power for operating the keypad unit 68, the speaker 70, and the wired transmitter 76. The remote control 56 also includes a power input 86 for providing electrical power from an external source to the power circuitry 84.

Two potential sources of such external electrical power are also illustrated in FIG. 2. Typically, electrical power may be supplied from such an external source to charge the battery 82, although such electrical power can also power the remote control 56. A cigarette lighter adapter 88 is illustrated as having an plug 90 at one end thereof that can be plugged into the power input 86 of the remote control 56, and a cigarette lighter plug 92 at the other end thereof that can be plugged into the cigarette lighter socket of a truck (not shown herein). An AC adapter 94 is also illustrated, and has a plug 96 at one end thereof that can be plugged into the power input 86 of the remote control 56, and a transformer 98 at the other end thereof that can be plugged into an outlet in a home or business.

Figure 3:
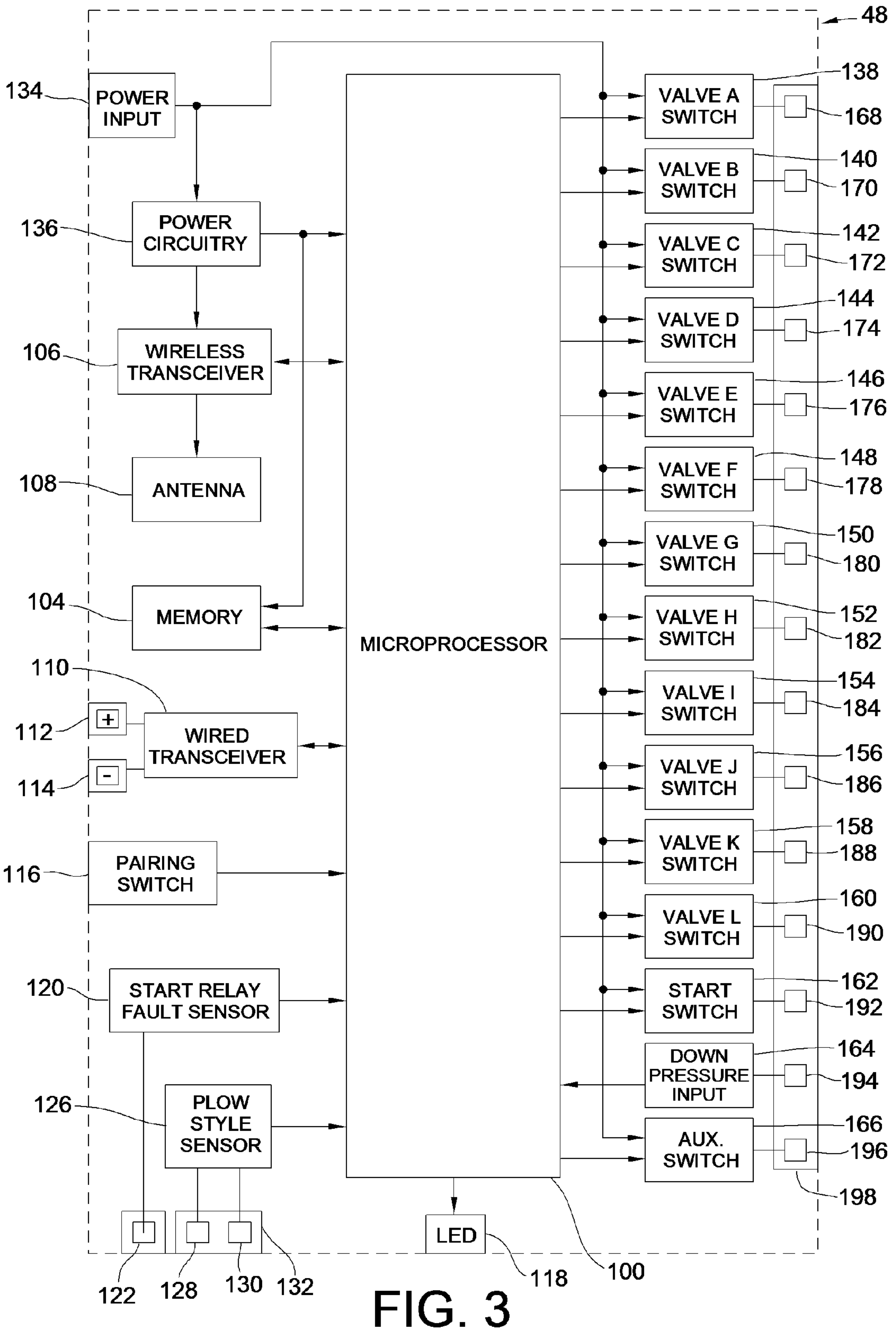
FIG. 3 is a functional schematic diagram of the snow plow controller illustrated in FIG. 1.

Referring next to FIG. 3, a functional schematic diagram of the plow controller 48 is illustrated. The plow controller 48 is based upon a microprocessor 100, which accesses a memory 104, which may include programmable memory. The microprocessor 100 includes a wireless transceiver 106 which is operated by the microprocessor 100 and which is connected to an antenna 108. In a preferred embodiment, the wireless transceiver 106 is a bidirectional transceiver; optionally, it may be a receiver only. The wireless transceiver 106 may also be a bidirectional digital radio transceiver, and may use the ZigBee communication protocol.

Optionally, the plow controller 48 may also include a wired transceiver 110 which is also operated by the microprocessor 100 and which is electrically connected to two terminals 112 and 114 that are accessible from the outside of the plow controller 48, and that may be used to connect a wire from the remote control 56 (shown in FIG. 1) to control the plow controller 48. In operation, only one of the wireless receiver 106 and the wired transceiver 110 will be used in conjunction with a particular vehicle.

A pairing switch 116 is connected to the microprocessor 100, and may be used to provide a momentary input to the microprocessor 100 at the time the plow controller 48 is being paired to the remote control 56 (this will be described in more detail in conjunction with the description of the operation of the programmable wireless remote control system and method disclosed herein). The pairing switch 116 may be a momentary contact switch which only closes while it is being actuated, or it could be, for example, a pair of contacts that may be shorted. The microprocessor 100 is capable of operating an LED 118 which can be used to provide an indication of the operational status of the plow controller 48 (i.e., whether or not the plow controller 48 is paired with the remote control 56).

A start relay fault sensor 120 provides an input to the microprocessor 100 that is indicative of the operation of the operation of the hydraulic system 38 (shown in FIG. 1). The start relay fault sensor 120 is electrically connected to a terminal 122 that is accessible from the outside of the plow controller 48, and that may be used to connect a wire from the output of the solenoid switch operating the hydraulic system 38. If, at a time when the hydraulic system 38 should be operating, there is no voltage at the terminal 122, this would be an indication that the solenoid switch was not operating, and the start relay fault sensor 120 would provide that information to the microprocessor 100.

A plow style sensor 126 may be used to provide an input to the microprocessor 100 that is indicative of the type of snow plow that the plow controller 48 is operating. The plow style sensor 126 is electrically connected to two terminals 128 and 130 that are contained in a connector 132 that is accessible from the outside of the plow controller 48. Different types of snow plows will provide different information via a connector (not shown herein) that is plugged into 132. By having that connector provide an input that is either a digital "zero" or a digital "one" to each of the terminals 128 and 130, up to four different plow types can be indicated.

Alternately, one or more switches could instead be mounted on the plow controller 48, with the position of the switches being used to indicate what type of snow plow the plow controller 48 was being used with. Another way of automatically detecting which type of snow plow is connected to the plow controller 48 will be discussed below following a description of the remaining components of the plow controller 48. Irrespective of the method used to determine the type of the snow plow, once the type of snow plow has been determined, the plow controller 48 will configure itself (through use of software stored in the memory 104) to operate that particular type of snow plow based upon commands from the remote control 56. In this manner, the plow controller 48 can be programmed to operate a plurality of different types of snow plows.

The plow controller 48 is operated with power supplied from the battery 44 of the truck 30 (shown in FIG. 1), which is provided to a power input 134, which in turn is connected to a power circuitry 136. The power circuitry 136 may typically supply electrical power to the microprocessor 100, the memory 104, the wireless transmitter 106, as well as to a plurality of electronically-operated switches that may be used to control the operation of the hydraulic system 38 (shown in FIG. 1). The power circuitry 136 may also provide the power for operating the wired transmitter 110 and the LED 118.

The plurality of electronically-operated switches referenced above that are used to control the operation of the hydraulic system 38 (shown in FIG. 1) include twelve valve switches 138, 140, 142, 144, 146, 148, 150, 152, 154, 156, 158, and 160 that are operated by the microprocessor 100. Another electronically-operated switch is a start switch 162, which is operated by the microprocessor 100 to control the operation of a solenoid (not shown herein) that operates the hydraulic pump (not shown herein) in the hydraulic system 38. It is the operation of this solenoid that is monitored by the start relay fault sensor 120.

Yet another electronically-operated switch is a Down Pressure system input 164, which is operated by the microprocessor 100 to control the operation of the system used by the assignee of the present patent application to control the hydraulic system 38 (shown in FIG. 1) to apply and maintain a downwardly-oriented pressure to the snow plow blade. (DOWN PRESSURE is a trademark owned by the assignee of the present patent application.) Still another electronically-operated switch is an auxiliary valve switch 166, which may be operated by the microprocessor 100 to control an optional accessory.

The valve switches 138, 140, 142, 144, 146, 148, 150, 152, 154, 156, 158, and 160, the start switch 162, the Down Pressure system input 164, and the auxiliary valve switch 166 are respectively electrically connected to terminals 168, 170, 172, 174, 176, 178, 180, 182, 184, 186, 188, 190, 192, 194, and 196 that may be contained in a connector 198 that is accessible from the outside of the plow controller 48 and that may be used to connect wire from these terminals to the proper location on the hydraulic system 38 (shown in FIG. 1). These electronically-operated switches are operated by the microprocessor 100, and are used to switch power from the power input 134 to the various components of the hydraulic system 38. Whether or not all of these items are contained in the single connector 198, they are intended to be connected to a wiring harness which interfaces with the snow plow, and such a wiring harness may also interface with the connector 132 which is electrically connected to the plow style sensor 126.

Figure 9:
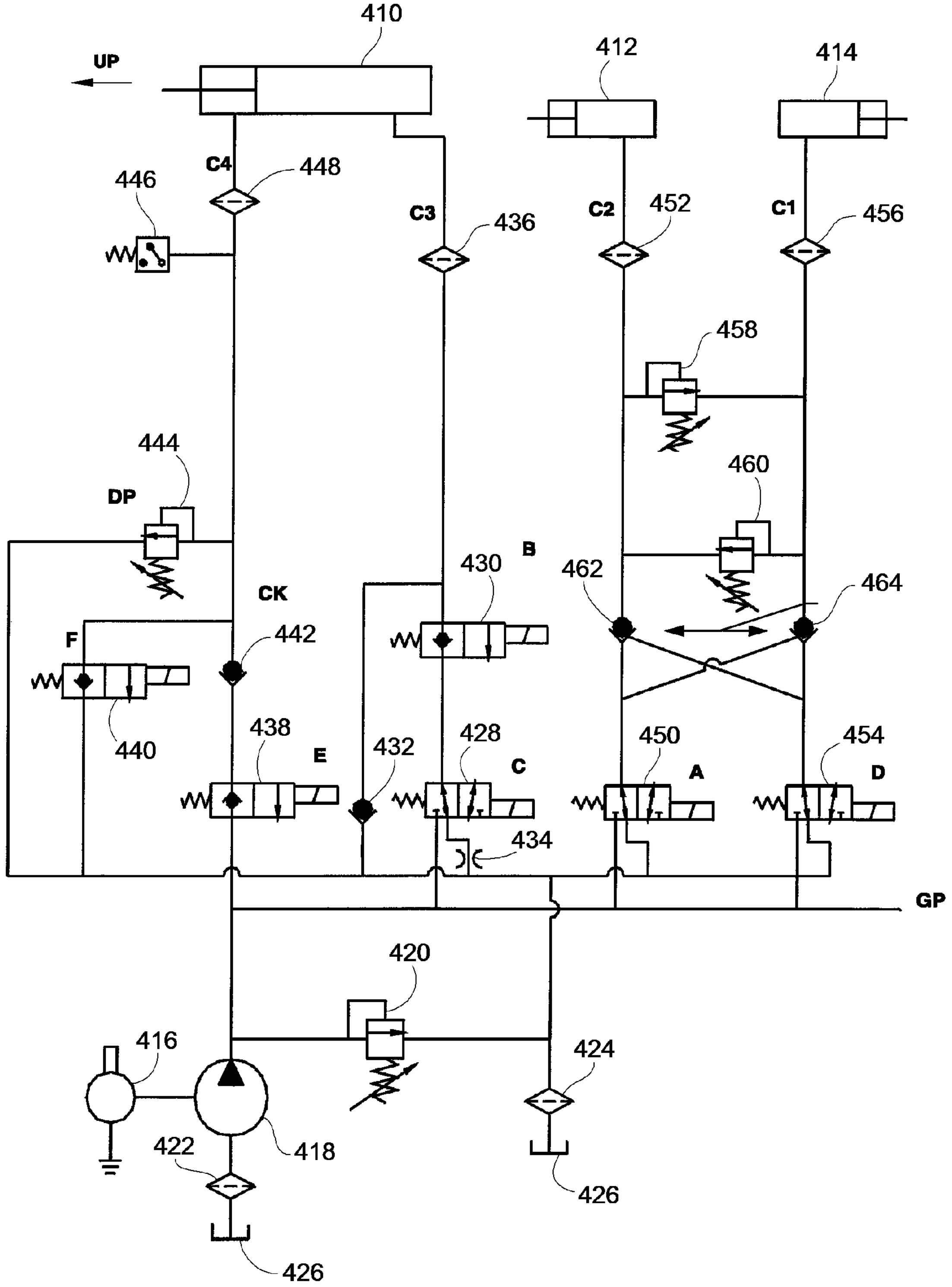
FIG. 9 is a hydraulic schematic diagram of a first hydraulic system for a straight blade snow plow that may be operated by the plow controller shown in FIG. 3.
Figure 10:
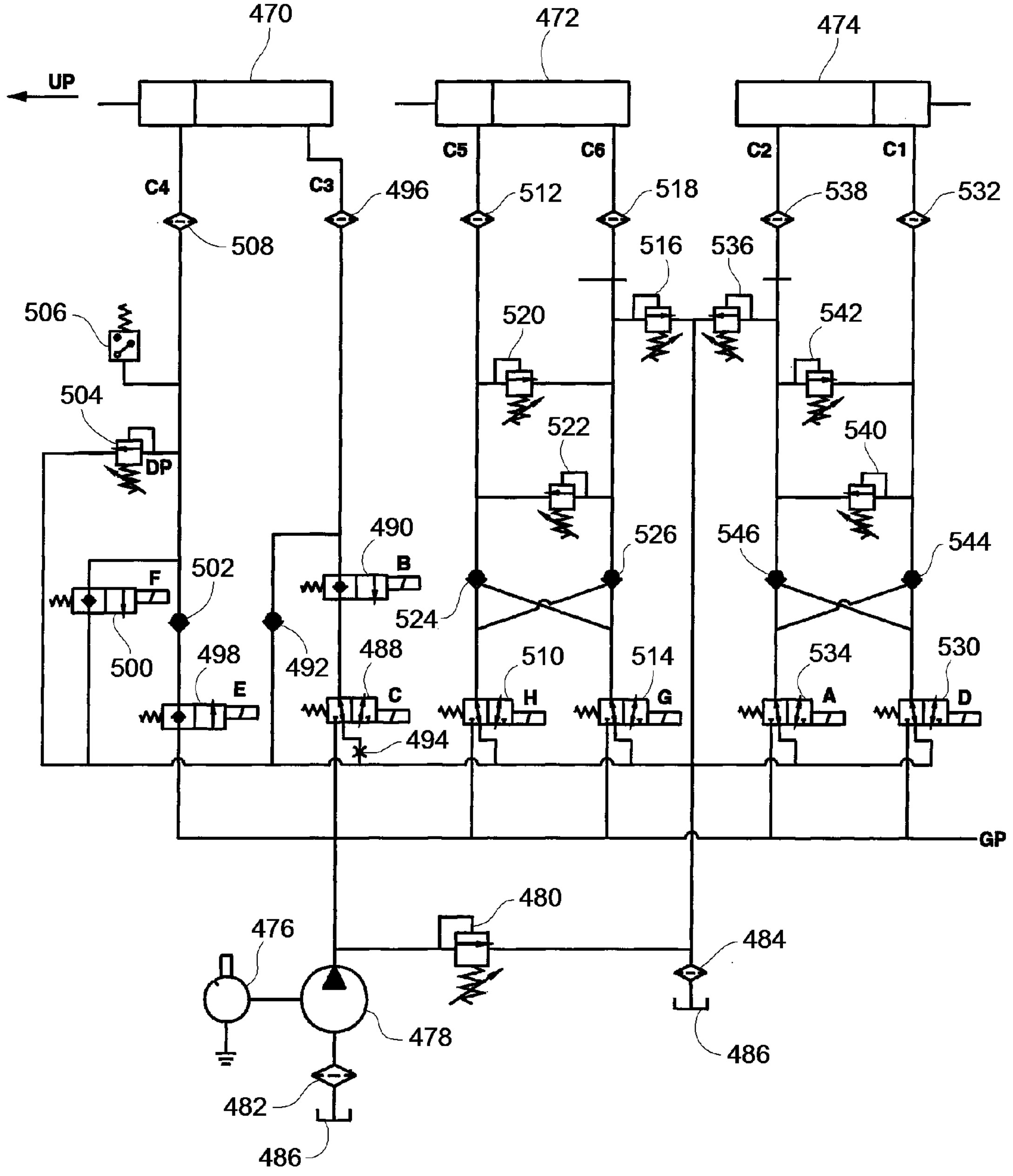
FIG. 10 is a hydraulic schematic diagram of a second hydraulic system for a V-plow snow plow that may be operated by the plow controller shown in FIG. 3.

Instead of using the plow style sensor 126 and corresponding components on each snow plow, a preferred embodiment of the programmable wireless remote control system and method disclosed herein instead automatically senses which of the valve switches 138, 140, 142, 144, 146, 148, 150, 152, 154, 156, 158, and 160 and the Down Pressure system input 164 are electrically connected to solenoid valves (not shown herein) on a snow plow. For example a straight blade snow plow may have solenoids connected to at least some of the valve switches 138, 140, 142, 144, 146, and 148, a V-plow may have solenoids connected to at least some of the valve switches 138, 140, 142, 144, 146, 148, 150, 152, 154, 156, 158, and 160, and other types of snow plows (such as, for example, a straight blade snow plow with hydraulically actuatable wings) may have solenoids connected to at least some of the valve switches 138, 140, 142, 144, 146, 148, 150, 152, 154, 156, and 158. Examples of hydraulic systems for operating a straight blade snow plow and a V-plow are illustrated in FIGS. 9 and 10, which will be discussed below.

A sensed connection to the Down Pressure system input 164 indicates that the snow plow to which the plow controller 48 is connected has a system that can apply and maintain a downwardly-oriented pressure to the snow plow blade. Instead of using the plow style sensor 126 to determine what type of snow plow is being used with the plow controller 48, an optional technique can instead be used to automatically determine the type of the snow plow being used. By automatically sensing which of the terminals in the connector 198 are electrically connected to components on the snow plow, the plow controller 48 can automatically detect what type of snow plow it is connected to and control that type of snow plow accordingly.

Figure 4:
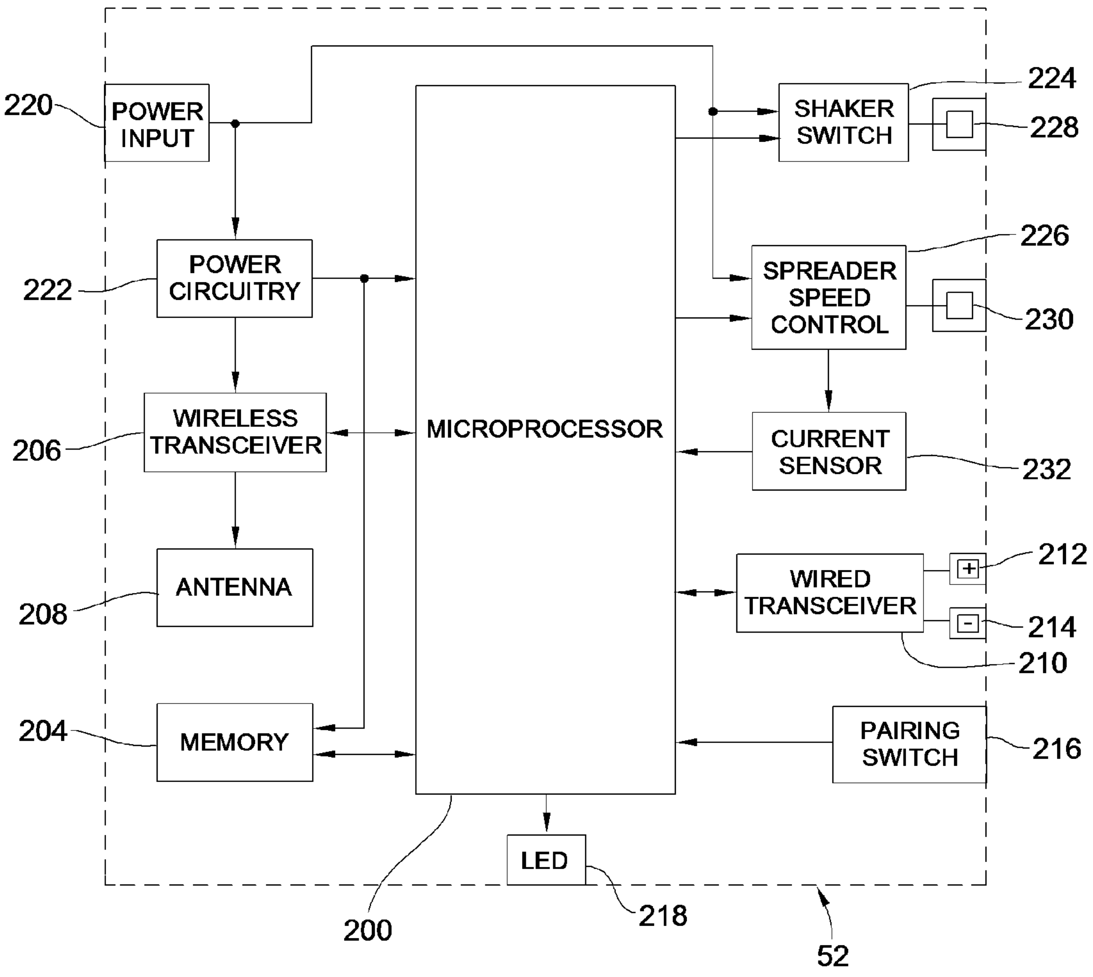
FIG. 4 is a functional schematic diagram of the spreader controller illustrated in FIG. 1.

Referring now to FIG. 4, a functional schematic diagram of the spreader controller 52 is illustrated. The spreader controller 52 is based upon a microprocessor 200, which accesses a memory 204, which may include programmable memory. The microprocessor 200 includes a wireless transceiver 206 which is operated by the microprocessor 200 and which is connected to an antenna 208. In a preferred embodiment, the wireless transceiver 206 is a bidirectional transceiver; optionally, it may be a receiver only. The wireless transceiver 206 may also be a bidirectional digital radio transceiver, and may use the ZigBee communication protocol.

Optionally, the spreader controller 52 may also include a wired transceiver 210 which is also operated by the microprocessor 200 and which is electrically connected to two terminals 212 and 214 that are accessible from the outside of the spreader controller 52, and that may be used to connect a wire from the remote control 56 (shown in FIG. 1) to control the spreader controller 52. In operation, only one of the wireless transceiver 206 and the wired transceiver 210 will be used in conjunction with a particular vehicle.

A pairing switch 216 is connected to the microprocessor 200, and may be used to provide a momentary input to the microprocessor 200 at the time the spreader controller 52 is being paired to the remote control 56 (this will be described in more detail in conjunction with the description of the operation of the programmable wireless remote control system and method disclosed herein). The pairing switch 216 may be a momentary contact switch which only closes while it is being actuated, or it could be, for example, a pair of contacts that may be shorted. The microprocessor 200 is capable of operating an LED 218 which can be used to provide an indication of the operational status of the spreader controller 52 (i.e., whether or not the spreader controller 52 is paired with the remote control 56).

The spreader controller 52 is operated with power supplied from the battery 44 of the truck 30 (shown in FIG. 1), which is provided to a power input 220, which in turn is connected to a power circuitry 222. The power circuitry 222 may typically supply electrical power to the microprocessor 200, the memory 204, the wireless transmitter 206, as well as to an electronically-operated shaker switch 224 and a spreader speed control 226 that will be used to operate the spreader unit 34 (shown in FIG. 1). The power circuitry 222 may also provide the power for operating the wired transmitter 210 and the LED 218.

The shaker switch 224 is operated by the microprocessor 200 to control a vibration mechanism (not shown herein) on the spreader unit 34 (shown in FIG. 1) that is used to shake the salt hopper to break up clogs that may be contained therein. The shaker switch 224 is electrically connected to a terminal 228 that is accessible from the outside of the spreader controller 52, and that may be used to connect a wire to control the shaker mechanism of the spreader unit 34. The spreader speed control 226 is operated by the microprocessor 200 to provide a variable output to control the operation and the speed of the spreader unit 34. The spreader speed control 226 is electrically connected to a terminal 230 that is accessible from the outside of the spreader controller 52, and that may be used to connect a wire to the spreader mechanism (not shown herein) of the spreader unit 34 to thereby control the operation of the spreader unit 34. Typically, a plurality of different speeds are used to control the amount of salt dispensed from the spreader unit 34.

A current sensor 232 is connected to the spreader speed control 226 to detect the amount of current that is being used to operate the spreader mechanism (not shown herein) of the spreader unit 34. A higher than normal current detected indicates that the spreader unit 34 is jammed, while a lower than normal current detected indicates that the spreader unit 34 is empty. The current sensor 232 provides an input to the microprocessor 200 that is indicative of the current that is being used to operate the spreader mechanism of the spreader unit 34.

Figure 5:
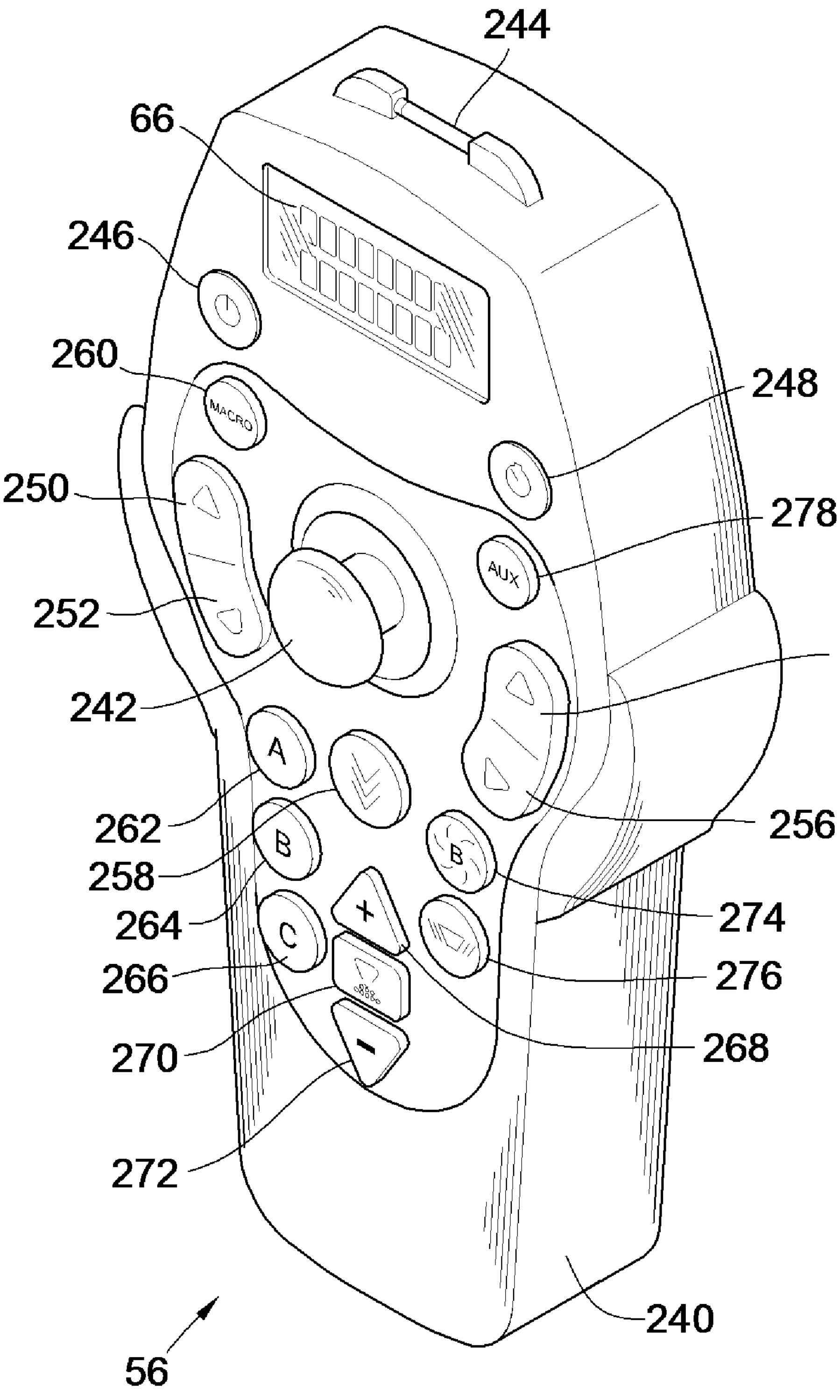
FIG. 5 is an isometric view of the remote control illustrated in FIGS. 1 and 2, showing the display, the joystick, and the various keys used on the remote control.

Referring next to FIG. 5, the exterior appearance of the remote control 56 is illustrated in a manner showing all of the controls of the keypad unit 68 (shown in FIG. 2). The keypad unit 68 itself is mounted inside a housing 240 such that only the individual buttons and a joystick 242 of the keypad unit 68 are visible in FIG. 2. The display 66 is located near the top of the front side of the remote control 56. Located on the top side of the remote control 56 is a pin 244 that is secured at its respective ends, with a lanyard (not shown herein) being installable on the pin 244.

The joystick 242 is located slightly above the midpoint of the front side of the remote control 56. The joystick 242 may be moved up and down to respectively raise and lower the snow plow blade (not shown in FIG. 5), and left and right to respectively move the snow plow blade to the left and right. Movement of the snow plow blade occurs while the joystick 242 is being actuated, and ceases when the joystick 242 returns to its spring-biased centered position. While the operation of the joystick 242 to control a straight blade plow is straightforward, if the joystick 242 is moved to the left or right while controlling a V-plow (not shown herein), it will simultaneously move both wings in the selected direction, up to the limits of each blade. Thus, if a V-plow is in the V position (with both the left blade and the right blade in their respective fully retracted positions), and the joystick 242 is moved to the right, the right blade, which is already fully retracted, will not move, while the left blade will extend to its limit if the joystick 242 is held to the right long enough.

The various buttons that are on the keypad unit 68 (shown in FIG. 2) will now be discussed. Two buttons are located immediately below the display 66 on opposite sides of the remote control 56. A POWER button 246 is located near the left side of the remote control 56, and a TIMER button 248 is located near the right side of the remote control 56. The POWER button 246 is used to turn the remote control 56 on and off, and the TIMER button 248 is used to set the time on the internal clock of the remote control 56, as well as to start and stop a job timer that is built into the remote control 56. The POWER button 246 may be backlit so that it is illuminated (for example, in green) when the remote control 56 is turned on. Similarly, the TIMER button 248 may be backlit so that it is illuminated (for example, in red) when the job timer is running.

Four buttons are located on opposite sides of the joystick 242, two on each side in with each pair of buttons being oriented with one above the other. On the left side of the joystick 242, an EXTEND LEFT button 250 is located above a RETRACT LEFT button 252, and on the right side of the joystick 242, an EXTEND RIGHT button 254 is located above a RETRACT RIGHT button 256. The EXTEND LEFT button 250 and the RETRACT LEFT button 252 are respectively used to extend and retract the left blade of a V-plow (not shown herein), and the EXTEND RIGHT button 254 and the RETRACT RIGHT button 256 are respectively used to extend and retract the right blade of a V-plow (not shown herein).

Located under the joystick 242 in a central location on the remote control 56 is a DOWN PRESSURE button 258 that is used to activate and deactivate the hydraulic system 38 (shown in FIG. 1) to apply and maintain a downwardly-oriented pressure on the snow plow blade. Pressing the DOWN PRESSURE button 258 once will cause the hydraulic system 38 to exert the downwardly-oriented pressure on the snow plow blade until the DOWN PRESSURE button 258 is pressed again to cease the downwardly-oriented pressure on the snow plow blade. The DOWN PRESSURE button 258 may be backlit so that it is illuminated (for example, in red) when downwardly-oriented pressure is being maintained on the snow plow blade.

The programmable wireless remote control system and method disclosed herein is capable of learning and running macro programs that may be actuated by pressing a single button. A MACRO button 260 is located on the remote control 56 near the left side thereof between the EXTEND LEFT button 250 and the POWER button 246. The MACRO button 260 is used to enter the macro learning mode. Three macro program buttons, MACRO A button 262, MACRO B button 264, and MACRO C program 266 are located in a descending vertical array near the left side of the remote control 56 and below the RETRACT LEFT button 252. The MACRO A button 262, MACRO B button 264, and MACRO C button 266 are each used to run a recorded macro program.

The remote control 56 also has five buttons that may be used to control the operation of the spreader unit 34 (shown in FIG. 1). Located in a descending vertical array below the DOWN PRESSURE button 258 are a SPREADER SPEED UP button 268, a SPREADER ON/OFF button 270, and a SPREADER SLOW DOWN button 272. Pressing the SPREADER ON/OFF button 270 once will turn the spreader unit 34 on (starting the spreading of salt), and pressing the SPREADER ON/OFF button 270 again will turn the spreader unit 34 off (stopping the spreading of salt). The SPREADER ON/OFF button 270 may be backlit so that it is illuminated (for example, in green) when the spreader unit 34 is running.

Pressing the SPREADER SPEED UP button 268 will speed up the rotation of the spreader unit 34 (if it is not already at its maximum speed), and pressing the SPREADER SLOW DOWN button 272 will slow down the rotation of the spreader unit 34 (if it is not already at its minimum speed). Upon pressing any one of the SPREADER ON/OFF button 270, the SPREADER SPEED UP button 268, or the SPREADER SLOW DOWN button 272, the display 66 may preferably display the speed of the spreader unit 34 (for example, by using a bar graph displayed on the display 66).

Two additional buttons to operate the spreader unit 34 are located on the right side of the remote control 56 in a descending array below the RETRACT RIGHT button 256. A BURST button 274 is used to momentarily cause the spreader unit 34 to operate at its maximum speed for so long as the BURST button 274 is pressed. A VIBRATE ON/OFF button 276 is used to actuate a vibration mechanism (not shown herein) on the spreader unit 34 (shown in FIG. 1) that is used to shake the salt hopper to break up clogs that may be contained therein.

Finally, an AUXILIARY button 278 is located on the remote control 56 near the right side thereof intermediate the TIMER button 248 and the EXTEND RIGHT button 254. The AUXILIARY button 278 may be used to control an auxiliary mechanism (not shown or otherwise discussed herein). The AUXILIARY button 278 may be backlit so that it is illuminated (for example, in blue) when the auxiliary mechanism is running.

Figure 6:
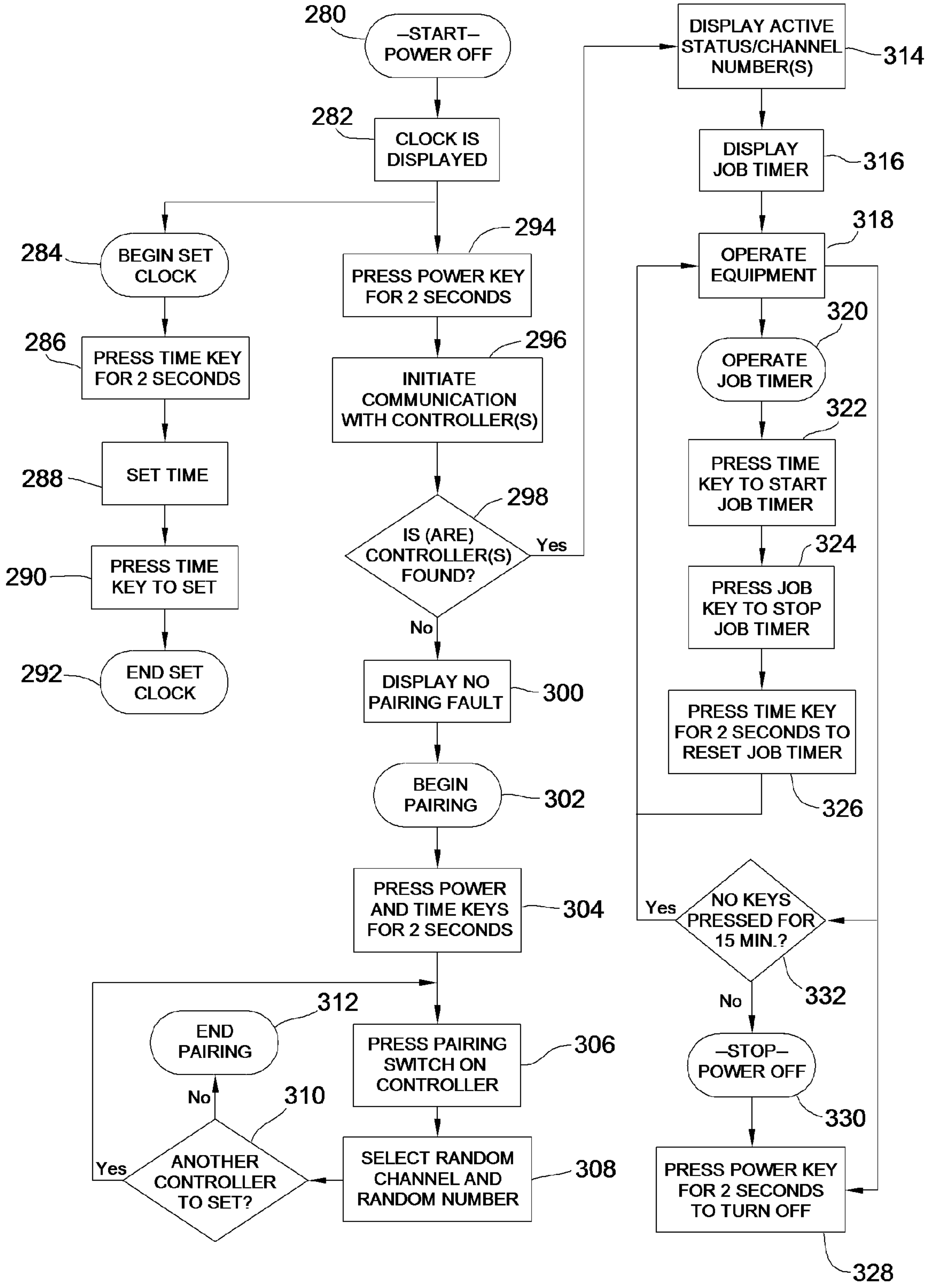
FIG. 6 is a first schematic flow diagram illustrating the operation of the remote control system and method taught herein, showing the startup and shutdown of the remote control system, the pairing of the remote control with the snow plow controller and the spreader controller, the operation of the job timer of the remote control system, and the setting of the clock of the remote control system.

Turning now to FIG. 6, several operations of the programmable wireless remote control system and method disclosed herein are shown and may be described. The operation of the programmable wireless remote control system and method begins with a start process step 280 with the remote control 56 turned off. While the remote control 56 is off, the remote control 56 (shown in FIG. 5) will display the time and date as indicated in a clock display step 282.

If it is desired to set the time and date, the process moves from the clock display step 282 to a set clock process initiation step 284. To enter the time and date set mode, the TIMER button 248 (shown in FIG. 5) is pressed and held for two seconds, as indicated in a press time key for 2 seconds step 286. Next, the time and date is set as indicated in a set time step 288 (this can be done using the joystick 242 (shown in FIG. 5), for example, to move from field to field and increment or decrement the selected field). Following setting the time and date, the TIMER button 248 is pressed to set the time and date, as indicated in a press time key to set step 290. The process then moves to a set clock process termination step 292, which terminates the time and date setting process, following which the process returns to the clock display step 282.

The startup of the programmable wireless remote control system and method begins by pressing the POWER button 246 (shown in FIG. 5) and holding it for two seconds, as indicated in a press power key for 2 seconds step 294. Upon startup of the remote control 56 (shown in FIG. 5), the remote control 56 attempts to establish communication with any controllers that are in proximity, such as the plow controller 48 and the spreader controller 52 (both shown in FIG. 1), in an initiate communications with controller(s) step 296. The process then moves to a controller(s) found determination 298. If no controller was found, the process moves to a display no pairing fault step 300 in which the display 66 (shown in FIG. 5) will display "LOST SIGNAL" thereupon.

The process may then move to a begin pairing step process initiation step 302 to initiate pairing between the remote control 56 (shown in FIG. 5) and the plow controller 48 and the spreader controller 52 (both shown in FIG. 1). The pairing process begins by pressing the POWER button 246 and the TIMER button 248 (both shown in FIG. 5) and holding them for two seconds, as indicated in a press power and time keys for 2 seconds step 304. At this point, the display 66 will display "Pairing Remotes." In order to pair the plow controller 48, the pairing switch 116 (shown in FIG. 3) must be closed, as indicated in a press pairing switch on controller step 306.

If the plow controller 48 (shown in FIG. 1) is detected when the pairing switch 116 is closed, the programmable wireless remote control system will select a channel and a random number to identify the plow controller 48 in a select random channel and random number step 308. The programmable wireless remote control system will also determine at this point from the plow style sensor 126 (shown in FIG. 3) what kind of snow plow the plow controller 48 is connected to operate, and will store this information in the remote control 56. The display 66 of the remote control 56 (shown in FIG. 5) will display "Paired PLOW."

At this point, the process moves to an additional controller determination step 310 in which it is determined whether or not another controller is to be paired to the remote control 56 (Shown in FIG. 5). If no other controller is to be paired, the POWER button 246 is pressed and the process moves to a pairing termination step 312. However, if another controller is to be paired, the process moves instead to the press pairing switch on controller step 306, wherein to pair the spreader controller 52, the pairing switch 216 (shown in FIG. 4) must be closed.

If the spreader controller 52 (shown in FIG. 1) is detected when the pairing switch 216 is closed, the programmable wireless remote control system will select a channel and a random number to identify the spreader controller 52 in the select random channel and random number step 308. The display 66 of the remote control 56 (shown in FIG. 5) will display "Paired SPREADER." The process then moves again to the additional controller determination step 310 in which the POWER button 246 is pressed, indicating that no other controller is to be paired to the remote control 56 (Shown in FIG. 5), whereupon the process moves to the pairing termination step 312.

Returning to the initiate communications with controller(s) step 296 and the controller(s) found determination 298, if it is determined that one or more controllers have been found after powering up the remote control 56, the process moves to a display active status/channel number(s) step 314 in which the display 66 of the remote control 56 (shown in FIG. 5) will display "Active" and the channel number. The display will alternate between two channels if both the plow controller 48 and the spreader controller 52 (both shown in FIG. 1) have been found. Communication is only initiated if both the channel number and the random number for the plow controller 48 and the spreader controller 52 are verified.

Following successful verification, the process moves to a display job timer step 316 in which the display 66 of the remote control 56 (shown in FIG. 5) will display a job timer which can be used to time a snow plowing job. At this point, the snow plow 32 and the spreader unit 34 (both shown in FIG. 1) can be operated, as indicated in an operate equipment step 318. In an exemplary embodiment contemplated herein, signals transmitted by the remote control 56 to the plow controller 48 and the spreader controller 52 may be verified by repeating the signals back to the remote control 56 to ensure that only verified signals are acted upon by the plow controller 48 and the spreader controller 52.

If the job timer is to be operated, the process moves to an operate job timer process initiation step 320, upon which pressing the TIMER button 248 (shown in FIG. 5) will start the job timer, as indicated in a press time key to start job timer step 322. Upon completion of the snow plowing job, the TIMER button 248 (shown in FIG. 5) may be pressed again to stop the job timer, as indicated in a press time key to stop job timer step 324. If it is desired to reset the job timer, the TIMER button 248 (shown in FIG. 5) may be pressed for two seconds to reset the job timer, as indicated in a press time key for 2 seconds to reset job timer step 326. The process then returns to the operate equipment step 318.

In order to turn the remote control 56 (shown in FIG. 5) off after use, the POWER button 246 (also shown in FIG. 5) may be pressed for two seconds to turn the remote control 56 off, as indicated in a press power key for 2 seconds to turn off step 328, whereupon the process moves to a power off process termination step 330. In addition, during the use of the programmable wireless remote control system, a continuous determination is made to determine whether no keys have been pressed for 15 minutes, as indicated in a no keys pressed for 15 mounted determination 332. If it is determined that no keys have been pressed for 15 minutes, the remote control 56 will automatically be turned off, moving the process to the power off process termination step 330.

Figure 7:
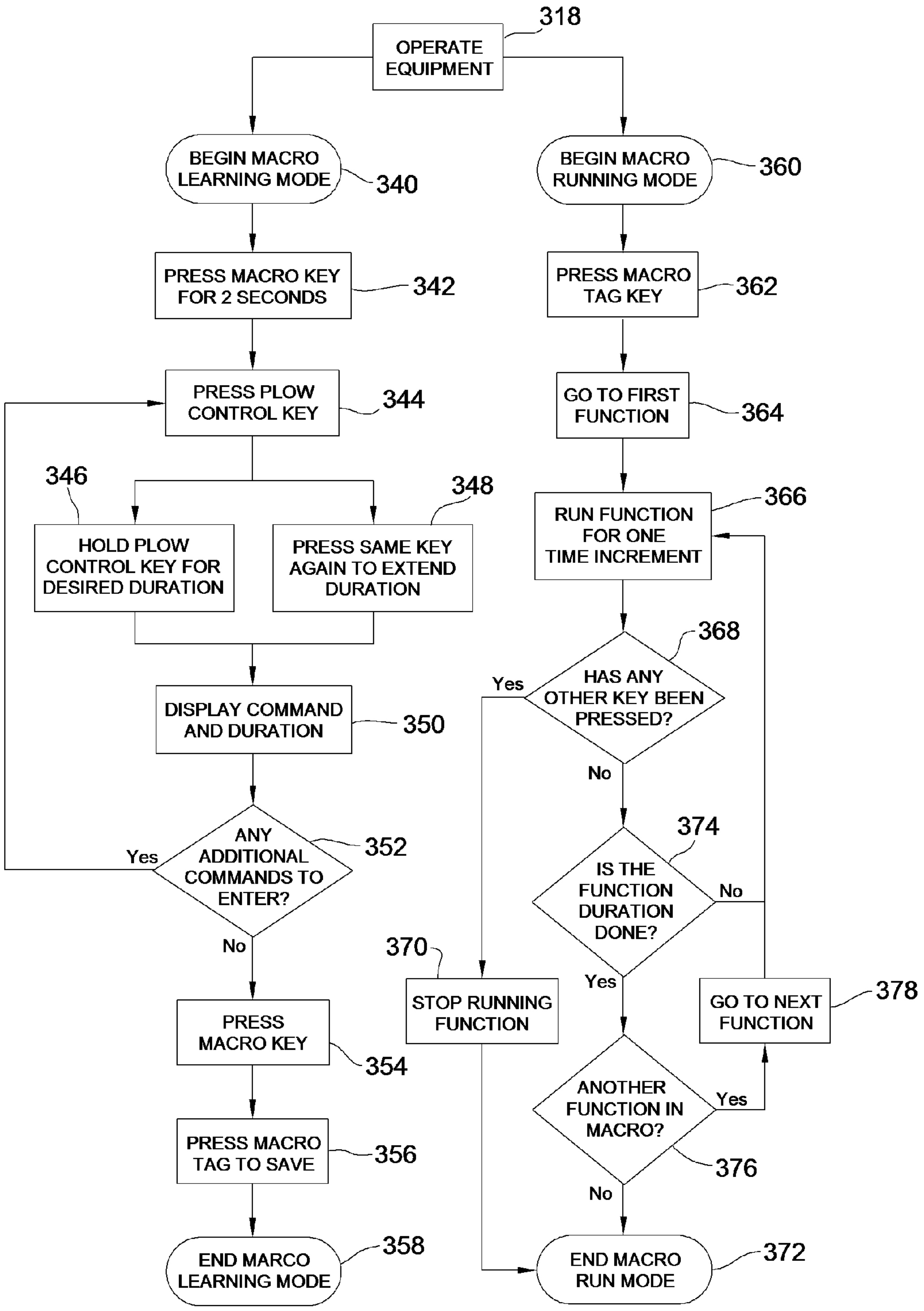
FIG. 7 is a second schematic flow diagram illustrating the operation of the remote control system and method taught herein, showing the operation of the macro learning and macro execution functions of the remote control system.

Turning next to FIG. 7, the macro learning and macro execution processes are illustrated. The macro learning process will be discussed first, beginning with a macro learning process initiation step 340. To begin the macro learning process, the MACRO button 260 (shown in FIG. 5) is pressed for two seconds, as indicated in a press macro key for 2 seconds sep 342, whereupon the display 66 (also shown in FIG. 5) will display "Begin Learning." At this point, the plow control keys are pressed in the order desired, and for the lengths of time desired as well, since each step will remember which key was pressed as well as for how long it was pressed (recall that each movement of a snow plow blade takes some period of time from the beginning of the movement to the end of the movement).

Thus, the first plow control key is pressed in a press plow control key step 344. With a preferred embodiment, there are two ways to set the duration that the plow control key will last. The first way is to hold the plow control key for the desired duration, as demonstrated in a hold plow control key for desired duration step 346. Alternately, the same plow control key can repeatedly be pressed, as indicated in a press same key again to extend duration step 348. Following either of these steps, the display 66 of the remote control 56 (shown in FIG. 5) will display both the plow control key selected and the step number, as well as the duration of the step in a display command and duration step 350.

For example, the display 66 of the remote control 56 (shown in FIG. 5) may display "BLADE DN, 01 03," which indicates that the blade down command is the first command in the macro being programmed, and that it has a duration of 03 time increments (e.g., a time increment can have a duration of approximately one-half second). The process then moves to an additional commands determination step 352 in which the user programming the macro will determine whether or not additional steps are to be entered. If there are additional steps to be programmed, the process returns to the press plow control key step 344 for the entry of one or more additional steps.

If no additional steps are to be programmed, the MACRO button 260 will be pressed in a press macro key step 354. Next, the particular one of the MACRO A button 262, the MACRO B button 264, and the MACRO C button 266 (all shown in FIG. 5) to which the programmed steps will be saved is selected in a press macro tag to save step 356. Once the programmed steps have been saved as a macro that is assigned to the selected one of the MACRO A button 262, the MACRO B button 264, and the MACRO C button 266, the macro learning process ends in a macro learning mode process termination step 358. Any additional macros can then be programmed, with the remote control 56 (shown in FIG. 5) being limited to storage of three macros, although additional buttons could be added to the remote control 56 to allow more macros to be saved.

The macro execution process will now be discussed, beginning with a macro running process initiation step 360. To begin, the desired one of the MACRO A button 262, the MACRO B button 264, and the MACRO C button 266 is pressed in a press macro tag key step 362. The remote control 56 (shown in FIG. 5) then begins to run the selected macro, beginning with the first plow control function in a go to first function step 364. This first function is run for one time increment in a run function for one time increment step 366.

There is then a determination as to whether any other key on the remote control 56 (shown in FIG. 1) has been pressed in an any other key pressed determination 368. It any other key has been pressed, execution of the macro is terminated in a stop running function step 370, following which the process moves to an end macro run mode process termination step 372. This is a safety feature which enables the immediate cessation of the macro upon pressing any other key (including the joystick 242 (also shown in FIG. 5).

If no other key has been pressed, the process moves instead from the any other key pressed determination 368 to a determination of whether the function being executed has run for its entire duration in a function duration determination step 374. If the function has not run for its entire duration, the process moves back to the run function for one time increment step 366. If, on the other hand, the function has run for its entire duration, the process instead moves to a determination of whether there is another function to be executed in the macro in an another function determination step 376.

If there is no remaining function in the macro to be run, the process moves to the end macro run mode process termination step 372. If, on the other hand, there is another function remaining in the macro to be run, the process instead moves to a go to next function step 378, in which the next function to be executed is initiated, after which the process moves to the run function for one time increment step 366. In this manner, all of the functions in the macro being executed are run.

Figure 8:
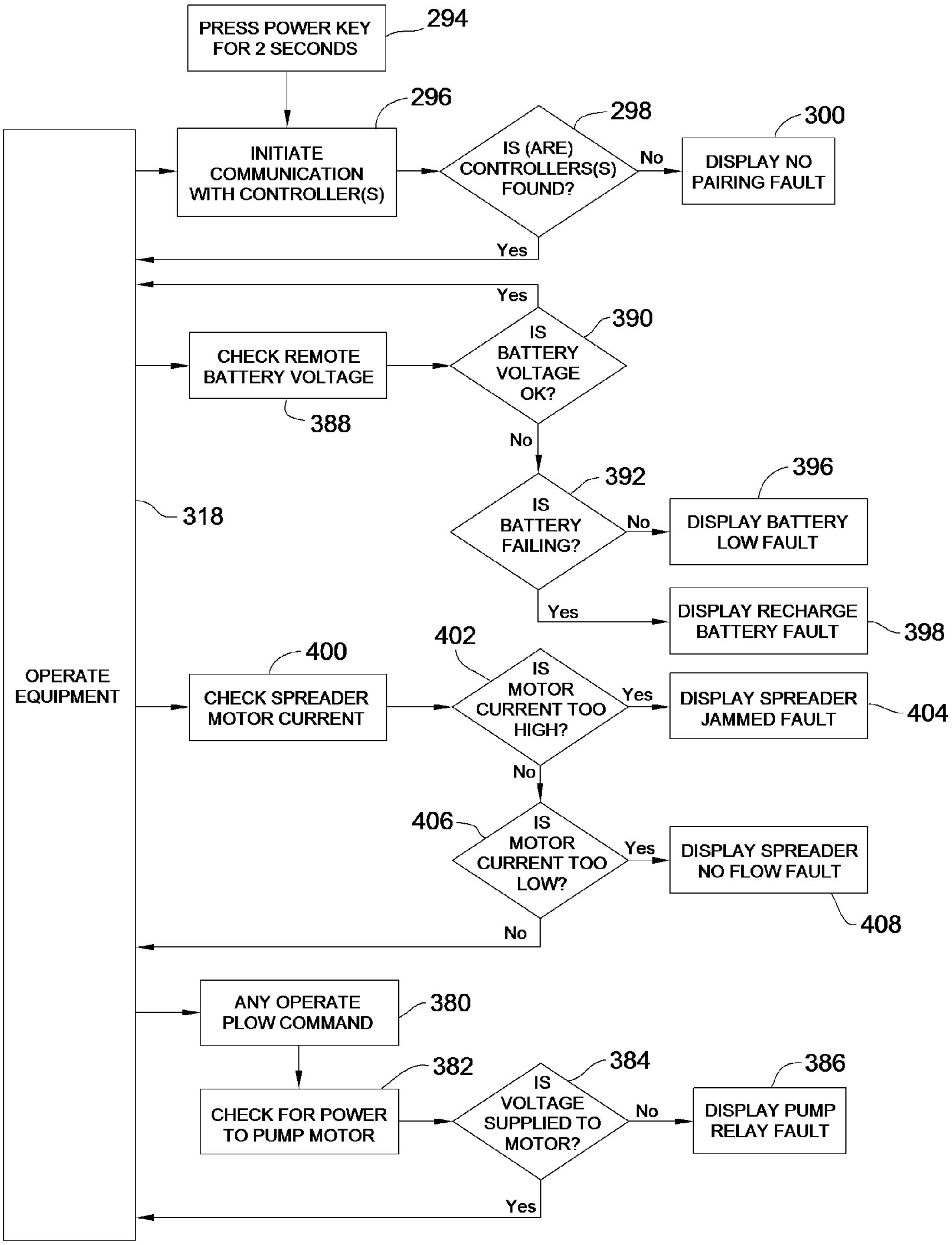
FIG. 8 is a third schematic flow diagram illustrating the operation of the remote control system and method taught herein, showing the operation of the fault detection and display functions of the remote control system.

Turning finally to FIG. 8, the operation of the fault detection and display functions of the remote control system are illustrated. Several of the steps from the power-up process shown in FIG. 6 are also shown in FIG. 8, including the press power key for 2 seconds step 294, the initiate communications with controller(s) step 296, and the controller(s) found determination 298. Upon determining in the controller(s) found determination 298 that no controller was found, the display 66 of the remote control 56 (shown in FIG. 5) will display "LOST SIGNAL" in the display no pairing fault step 300. This communication determination step is periodically repeated during normal operation of the snow plow 32 and the spreader unit 34. Accordingly, if, after pairing was originally established, during operation of the programmable wireless remote control system and method disclosed herein in the operate equipment step 318 pairing is lost, the display 66 of the remote control 56 will at that time display "LOST SIGNAL" in the display no pairing fault step 300.

Whenever the snow plow 32 (shown in FIG. 1) is being operated by the hydraulic system 38 (also shown in FIG. 1), if at a time when the hydraulic system 38 should be operating, there is no voltage at the terminal 122 of the plow controller 48 (shown in FIG. 3), which indicates that the solenoid switch on the hydraulic system 38 is not operating, the start relay fault sensor 120 (also shown in FIG. 3) provides that information to the microprocessor 100 of the plow controller 48 (also shown in FIG. 3). Accordingly, following a command to perform any plow command (shown in an any operate plow command step 380), in a check for power to pump motor step 382, this voltage is read. In a voltage supplied to motor determination step 384, if this voltage is low, indicating that the solenoid switch on the hydraulic system 38 is not operating properly, the display 66 of the remote control 56 (shown in FIG. 5) will display "RELAY FAULT" in a display pump relay fault step 386.

Another fault detection and display function is a check of the battery 82 of the remote control 56 (shown in FIG. 2). Periodically, the voltage of the battery 82 is checked in a check remote battery voltage step 388. In a battery OK determination 390, it is determined whether or not the voltage of the battery 82 is low or not. If the battery 82 is not low, this fault detection process ends. If, on the other hand, the voltage of the battery 82 is low, the process moves to a battery failing determination step 392. If the battery is not near failure (but rather only low voltage), the display 66 of the remote control 56 (shown in FIG. 5) will display "BATTERY LOW" in a display low battery fault step 396. If, on the other hand, the battery is near failure, the display 66 of the remote control 56 will display "RECHARGE BATTERY" in an imminent battery failure fault step 398.

Yet another fault detection and display function is a check of the current being used to operate the motor of the spreader unit 34 (shown in FIG. 1) which is performed in a check spreader motor current step 400. Whenever the spreader unit 34 is being operated by the spreader controller 52 (also shown in FIG. 1), the current used to operate the motor of the spreader unit 34 is monitored by the current sensor 232 (shown in FIG. 3). If the current used to operate the motor of the spreader unit 34 is too high, as determined in a motor current high determination 402, the display 66 of the remote control 56 (shown in FIG. 5) will display "SPREADER JAMMED" in a display spreader jammed fault step 404.

If, on the other hand, the current used to operate the motor of the spreader unit 34 is not too high, as determined in a motor current high determination 402, the process moves instead to a motor current low determination 406. If the current used to operate the motor of the spreader unit 34 is too low, as determined in the motor current low determination 406, the display 66 of the remote control 56 (shown in FIG. 5) will display "SPREADER NO FLOW" in a display spreader no flow fault step 408. If, on the other hand, the current used to operate the motor of the spreader unit 34 is not too low, as determined in the motor current low determination 406, this fault detection process ends.

EXAMPLE

Straight Blade Snow Plow Hydraulic System

Referring to FIG. 9, an exemplary hydraulic system that may be operated by the plow controller 48 (shown in FIG. 3) for actuating a straight blade snow plow is illustrated. The straight blade snow plow is represented by three hydraulic cylinders, namely a double acting raise cylinder 410, a single acting left pivot cylinder 412, and a single acting right pivot cylinder 414. The hydraulic system operates with an electric motor 416 that is actuated by the start switch 162 of the plow controller 48 (shown in FIG. 3), with the electric motor 416 operating a hydraulic pump 418 that provides hydraulic fluid under pressure and including a system relief valve 420 to control pressure in the hydraulic system. Also included in the hydraulic fluid supply and system relief circuit are two filters 422 and 424 and a hydraulic fluid reservoir 426.

Hydraulic operation of the raise cylinder 410 has two fluid paths, the first of which raises the straight plow and includes a raise valve 428 (actuated by the valve switch 142 of the plow controller 48), a float/down pressure valve 430 (actuated by the valve switch 140 of the plow controller 48), and a check valve 432. Also included in the first fluid path is a flow restrictor 434 and a filter 436. The second fluid path which lowers the straight plow and maintains a downwardly-oriented pressure on the snow plow blade includes a down pressure valve 438 (actuated by the valve switch 146 of the plow controller 48), a raise/float valve 440 (actuated by the valve switch 148 of the plow controller 48), a check valve 442, and a down pressure relief valve 444. Also included in the second fluid path is a down pressure pressure switch 446 (which is connected to the Down Pressure system input 164) and a filter 448.

Hydraulic operation of the single acting left pivot cylinder 412 is via a right angle valve 450 (actuated by the valve switch 138 of the plow controller 48) and a filter 452. Hydraulic operation of the single acting right pivot cylinder 414 is via a left angle valve 454 (actuated by the valve switch 144 of the plow controller 48) and a filter 456. There are two crossover relief valves 458 and 460 and two pilot operated check valves 462 and 464 that are connected between the lines to the single acting left pivot cylinder 412 and the single acting right cylinder 414.

EXAMPLE

V-Plow Hydraulic System

Referring to FIG. 10, an exemplary hydraulic system that may be operated by the plow controller 48 (shown in FIG. 3) for actuating a V-plow is illustrated. The V-plow is represented by three hydraulic cylinders, namely a double acting raise cylinder 470, a double acting left wing cylinder 472, and a double acting right wing cylinder 474. The hydraulic system operates with an electric motor 476 that is actuated by the start switch 162 of the plow controller 48 (shown in FIG. 3), with the electric motor 476 operating a hydraulic pump 478 that provides hydraulic fluid under pressure and including a system relief valve 480 to control pressure in the hydraulic system. Also included in the hydraulic fluid supply and system relief circuit are two filters 482 and 484 and a hydraulic fluid reservoir 486.

Hydraulic operation of the raise cylinder 470 has two fluid paths, the first of which raises the V-plow and includes a raise valve 488 (actuated by the valve switch 142 of the plow controller 48), a float/down pressure valve 490 (actuated by the valve switch 140 of the plow controller 48), and a check valve 492. Also included in the first fluid path is a flow restrictor 494 and a filter 496. The second fluid path which lowers the V-plow and maintains a downwardly-oriented pressure on the snow plow blade includes a down pressure valve 498 (actuated by the valve switch 146 of the plow controller 48), a raise/float valve 500 (actuated by the valve switch 148 of the plow controller 48), a check valve 502, and a down pressure relief valve 504. Also included in the second fluid path is a down pressure pressure switch 506 (which is connected to the Down Pressure system input 164) and a filter 508.

Hydraulic operation of the double acting left wing cylinder 472 has two fluid paths, the first of which retracts the left wing of the V-plow and includes a left retract valve 510 (actuated by the valve switch 152 of the plow controller 48) and a filter 512. The second fluid path of the double acting left wing cylinder 472 extends the left wing of the V-plow and includes a left extend valve 514, a left wing relief valve 516, and a filter 518. There are two crossover relief valves 520 and 522 and two pilot operated check valves 524 and 526 that are connected between the lines on the opposite sides of the double acting left wing cylinder 472.

Hydraulic operation of the double acting right wing cylinder 474 has two fluid paths, the first of which retracts the right wing of the V-plow and includes a right retract valve 530 (actuated by the valve switch 144 of the plow controller 48) and a filter 532. The second fluid path of the double acting right wing cylinder 474 extends the right wing of the V-plow and includes a right extend valve 534, a right wing relief valve 536, and a filter 538. There are two crossover relief valves 540 and 542 and two pilot operated check valves 544 and 546 that are connected between the lines on the opposite sides of the double acting right wing cylinder 474.

It may therefore be appreciated from the above detailed description of the exemplary embodiments of the present invention that it teaches an improved programmable wireless remote control system and method for controlling a snow plow. The programmable wireless remote control system and method disclosed herein is capable of working with any one of a plurality of different types of snow plows, even snow plows having different configurations which generally require different controls having different capabilities. The programmable wireless remote control system and method disclosed herein is capable of automatically sensing which type of snow plow is connected to the remote control system and adapting itself to operate the sensed type of snow plow. The programmable wireless remote control system and method disclosed herein is also operable to wirelessly control a spreader unit in addition to controlling a snow plow, with only a single remote control being required to control both the snow plow and the spreader unit.

The programmable wireless remote control system and method disclosed herein provides diagnostics to monitor important functions of a snow plow and/or a spreader unit, with the remote control functioning to inform a user of the occurrence of any of such monitored faults. The programmable wireless remote control system and method disclosed herein are capable of both creating and playing macros that run customized programs upon the actuation of a single button, with the user of the programmable wireless remote control system and method being able to programsuch customized programs quickly and easily. The programmable wireless remote control system and method disclosed herein also provide a job timer to enable users who are professional snow plow operators who bill on the basis of time spent to easily track the amount of time spent performing a job.

The programmable wireless remote control system disclosed herein is of a construction which is both durable and long lasting, and which will require little or no maintenance to be provided by the user throughout its operating lifetime. The programmable wireless remote control system and method disclosed herein is also of relatively inexpensive construction to enhance its market appeal and to thereby afford it the broadest possible market. Finally, all of the aforesaid advantages and objectives of the programmable wireless remote control system and method are achieved without incurring any substantial relative disadvantage.

Although the foregoing description of the programmable wireless remote control system and method has been shown and described with reference to particular embodiments and applications thereof, it has been presented for purposes of illustration and description and is not intended to be exhaustive or to limit the coverage of the claims to the particular embodiments and applications disclosed. It will be apparent to those having ordinary skill in the art that a number of changes, modifications, variations, or alterations to the invention as described herein may be made, none of which depart from the spirit or scope of the device and method disclosed herein. The particular embodiments and applications were chosen and described to provide the best illustration of the principles of the device and method and their practical application to thereby enable one of ordinary skill in the art to utilize the device and method in various embodiments and with various modifications as are suited to the particular use contemplated. All such changes, modifications, variations, and alterations should therefore be seen as being within the scope of the device and method disclosed herein as determined by the appended claims when interpreted in accordance with the breadth to which they are fairly, legally, and equitably entitled.

What is claimed is:

1. A remote control system for a snow plow mounted on a vehicle, the snow plow having a snow plow blade operated by a hydraulic system with solenoid valves that are operated by electrical signals to control the snow plow, said remote control system comprising:

a plow controller for providing the electrical signals to the solenoid valves of the hydraulic system of the snow plow to control the snow plow, said plow controller being mountable on the snow plow; and a remote control for transmitting signals to said plow controller to cause said plow controller to provide electrical signals to the solenoid valves of the hydraulic system of the snow plow to control the snow plow as directed by a user of said remote control;

wherein said plow controller is arranged and configured to be capable of controlling any one of a plurality of different types of snow plows at a time; and wherein said remote control is arranged and configured to have controls located thereupon to allow the user to control any one of said plurality of different types of snow plows at a given time.

2. A remote control system as defined in claim 1, wherein said plow controller comprises:

a plow controller transceiver for communicating with said remote control;

and wherein said remote control comprises:

a remote control transceiver for communicating with said plow controller, wherein said plow controller transceiver and said remote control transceiver communicate with each other.

3. A remote control system as defined in claim 2, wherein said remote control transceiver and said plow controller transceiver communicate with each other wirelessly.

4. A remote control system as defined in claim 2, wherein said plow controller additionally comprises:

a plow controller wired transceiver for communicating with said remote control;

and wherein said remote control additionally comprises:

a remote control wired transceiver for communicating with said plow controller, wherein said plow controller wired transceiver and said remote control wired transceiver communicate with each other if they are connected together with wires.

5. A remote control system as defined in claim 4, wherein said remote control transceiver and said plow controller transceiver are disabled if said remote control wired transceiver and said plow controller wired transceiver are connected together with wires, and wherein said remote control wired transceiver and said plow controller wired transceiver are disabled if said remote control wired transceiver and said plow controller wired transceiver are not connected together with wires.

6. A remote control system as defined in claim 1, wherein said remote control and said plow controller are paired together prior to their first use together as a remote control system, following which said plow controller can only be operated by said remote control that said plow controller was paired with.

7. A remote control system as defined in claim 6, wherein any of a plurality of said remote controls may be paired with any of a plurality of said plow controllers without modifying either of said remote controls or said plow controllers.

8. A remote control system as defined in claim 1, wherein said remote control is self-contained and battery-powered.

9. A remote control system as defined in claim 1, wherein said controls located upon said remote controller comprise:

a first plurality of controls for operating a first kind of snow plow; and a second plurality of controls for operating a second kind of snow plow;

wherein said first and second plurality of controls are not the same.

10. A remote control system as defined in claim 1, wherein said plurality of different types of snow plows comprises at least:

a straight blade snow plow; and a V-plow snow plow.

11. A remote control system as defined in claim 1, wherein said plow controller comprises:

an input which provides information to said plow controller that defines which one of said plurality of different types of snow plows said plow controller is to be configured to operate.

12. A remote control system as defined in claim 11, wherein said input comprises:

a plurality of electrical inputs that are either a digital "zero" or a digital "one," a status of said plurality of electrical inputs identifying a particular type of snow plow.

13. A remote control system as defined in claim 11, wherein said input comprises:

a plurality of electrical switches that are either "off" or "on," a status of said plurality of electrical switches identifying a particular type of snow plow.

14. A remote control system as defined in claim 11, wherein said input comprises:

a particular combination of solenoid valves that are electrically connected to said plow controller.

15. A remote control system as defined in claim 1, wherein said remote control comprises:

a display for viewing information about an operational status of said remote control system and/or the snow plow being operated by said remote control system.

16. A remote control system as defined in claim 15, additionally comprising:

a timer for monitoring a time period during operation of said remote control system to operate the snow plow; and wherein said controls located upon said remote control comprise a control element for operating said timer;

and wherein said remote control is capable of displaying a time period on said display.

17. A remote control system as defined in claim 15, wherein said plow controller comprises:

a fault sensor for monitoring the operational status of the hydraulic system of the snow plow being operated by said remote control system, wherein information relating to a fault in the hydraulic system is transmitted to said remote control;

wherein, upon the transmission of information relating to the fault in the hydraulic system from said plow controller to said remote control, said remote control provides an indication of the fault in the hydraulic system on said display.

18. A remote control system as defined in claim 1, wherein said remote control comprises:

a speaker for providing audible feedback as controls are operated, and/or a warning signal to indicate an operational status of the snow plow being operated by said remote control system such as a fault.

19. A remote control system as defined in claim 1, wherein said remote control system is programmable to enable the user of said remote control to select a single command using said controls on said remote control to cause said remote control system to operate said snow plow to perform a plurality of operations.

20. A remote control system as defined in claim 19, wherein said remote control system is also programmable to enable a user of said remote control to program said plurality of operations in association with said single command so that said plurality of operations may subsequently be performed by selecting said single command.

21. A remote control system as defined in claim 20, wherein said remote control system is programmable to enable a user of said remote control to program more than one plurality of operations each in association with a single command.

22. A remote control system as defined in claim 20, additionally comprising:

a display for viewing information about said plurality of operations as they are programmed in association with said single command.

23. A remote control system as defined in claim 20, wherein each of said plurality of operations being programmed in association with said single command comprises:

a type of operation associated with operation of the snow plow; and a duration of each of said plurality of operations.

24. A remote control system as defined in claim 19, wherein the performance of said plurality of operations can be stopped by actuation of any of said controls on said remote control during the performance of said plurality of operations.

25. A remote control system as defined in claim 1, wherein said remote control system can also control a spreader mounted on the vehicle.

26. A remote control system as defined in claim 25, additionally comprising:

a spreader controller for providing electrical signals to the spreader to control the spreader, said spreader controller being mountable on the spreader or the vehicle;

wherein said spreader controller is arranged and configured to control a spreader; and wherein said remote control is arranged and configured to have controls located thereupon to allow the user to control the spreader.

27. A remote control system as defined in claim 26, wherein said spreader controller comprises:

a spreader controller transceiver for communicating with said remote control;

and wherein said remote control comprises:

a remote control transceiver for communicating with said spreader controller, wherein said spreader controller transceiver and said remote control transceiver communicate with each other.

28. A remote control system as defined in claim 26, wherein said remote control and said spreader controller are paired together prior to their first use together as a remote control system, following which said spreader controller can only be operated by said remote control that said spreader controller was paired with.

29. A remote control system as defined in claim 25, wherein said remote control comprises:

a display for viewing information about the operational status of the spreader being operated by said remote control system.

30. A remote control system as defined in claim 29, wherein said information about the operational status of the spreader comprises at least one of a jammed spreader condition and a no flow condition.

31. A remote control system as defined in claim 25, wherein said remote control system can vary a speed of the spreader.

32. A remote control system for a snow plow mounted on a vehicle, the snow plow having a snow plow blade operated by a hydraulic system with solenoid valves that are operated by electrical signals to control the snow plow, said remote control system comprising:

a plow controller for providing the electrical signals to the solenoid valves of the hydraulic system of the snow plow to control the snow plow, said plow controller being mountable on the snow plow;

a spreader controller for providing electrical signals to a the spreader to control the spreader, said spreader controller being mountable on the spreader or the vehicle; and a remote control for transmitting signals to said plow controller to cause said plow controller to provide the electrical signals to the solenoid valves of the hydraulic system of the snow plow to control the snow plow as directed by a user of said remote control;

wherein said plow controller is arranged and configured to be capable of controlling the snow plow; and wherein said spreader controller is arranged and configured to control the spreader; and wherein said remote control is arranged and configured to have controls located thereupon to allow the user to control the snow plow and the spreader.

33. A remote control system for a snow plow mounted on a vehicle, the snow plow having a snow plow blade operated by a hydraulic system with solenoid valves that are operated by electrical signals to control the snow plow, said remote control system comprising:

a plow controller for providing the electrical signals to the solenoid valves of the hydraulic system of the snow plow to control the snow plow, said plow controller being mountable on the snow plow; and a remote control for transmitting signals to said plow controller to cause said plow controller to provide the electrical signals to the solenoid valves of the hydraulic system of the snow plow to control the snow plow as directed by a user of said remote control;

wherein said plow controller is arranged and configured to be capable of controlling any one of a plurality of different types of snow plows at a time; and wherein said remote control system is programmable to enable the user of said remote control to select a single command using controls on said remote control to cause said remote control system to operate said snow plow to perform a plurality of operations.

34. A remote control system for a snow plow mounted on a vehicle, the snow plow having a snow plow blade operated by a hydraulic system with solenoid valves that are operated by electrical signals to control the snow plow, said remote control system comprising:

a plow controller for providing the electrical signals to the solenoid valves of the hydraulic system of the snow plow to control the snow plow, said plow controller being mountable on the snow plow; and a remote control for transmitting signals to said plow controller to cause said plow controller to provide the electrical signals to the solenoid valves of the hydraulic system of the snow plow to control the snow plow as directed by a user of said remote control;

wherein said plow controller is arranged and configured to be capable of determining which one of a plurality of different types of snow plows said plow controller is operating at a time; and wherein said remote control is arranged and configured to have controls located thereupon to allow the user to control any one of said plurality of different types of snow plows at a time.

35. A remote control system for a snow plow mounted on a vehicle, the snow plow having a snow plow blade operated by a hydraulic system with solenoid valves that are operated by electrical signals to control the snow plow, said remote control system comprising:

a plow controller for operating the hydraulic system of the snow plow to control the snow plow; and a remote control for transmitting signals to said plow controller to cause said plow controller to operate the hydraulic system to control the snow plow;

wherein said plow controller is capable of controlling any one of a plurality of different types of snow plows at a time; and wherein said remote control allows a user to control any one of said plurality of different types of snow plows at a time.

36. A method of remotely controlling a snow plow mounted on a vehicle, the snow plow having a snow plow blade operated by a hydraulic system with solenoid valves that are operated by electrical signals to control the snow plow, said method comprising:

with a plow controller, providing the electrical signals to the solenoid valves of the hydraulic system of the snow plow to control the snow plow, said plow controller being mountable on the snow plow; and with a remote control, transmitting signals to said plow controller to cause said plow controller to provide electrical signals to the solenoid valves of the hydraulic system of the snow plow to control the snow plow as directed by a user of said remote control;

arranging and configuring said plow controller to be capable of controlling any one of a plurality of different types of snow plows at a time; and arranging and configuring said remote control to have controls located thereupon to allow the user to control any one of said plurality of different types of snow plows at a time.

* * * * *

UNITED STATES PATENT AND TRADEMARK OFFICE

CERTIFICATE OF CORRECTION

PATENT NO. : 8,185,276 B2
APPLICATION NO. : 12/140466
DATED : May 22, 2012
INVENTOR(S) : Mark D. Buckbee et al.

It is certified that error appears in the above-identified patent and that said Letters Patent is hereby corrected as shown below:

In the specification

Column 1, line 17
"operation of most truck-installed snow plow being controlled" should read --operation of most truck-installed snow plows being controlled--.

Column 1, line 18
"by a self-contained hydraulic system that is capably of at least" should read --by a self-contained hydraulic system that is capable of at least--.

Column 1, line 60
"cab in proximity to receiver on the snow plow. The remote" should read --cab in proximity to the receiver on the snow plow. The remote--.

Column 2, line 9
"Such spreader units includes a hopper for containing a" should read --Such spreader units include a hopper for containing a--.

Column 2, line 18
"the cab of the truck. The spreader remote controls is" should read --the cab of the truck. The spreader remote control is--.

Column 3, line 51
"remote control system include both a clock and a job" should read --remote control system includes both a clock and a job--.

Column 3, line 54
"performed, a highly useful feature to user providing snow" should read --performed, a highly useful feature to users providing snow--.

Column 4, line 15
"system and method being able to programming such" should read --system and method being able to program such--.

Signed and Sealed this
Tenth Day of July, 2012

David J. Kappos
*Director of the United States Patent and Trademark Office*

Column 5, line 51
"also connected the microprocessor 60, for providing user" should read --also connected to the microprocessor 60, for providing user--.

Column 6, line 23
"having an plug 90 at one end thereof that can be plugged into" should read --having a plug 90 at one end thereof that can be plugged into--.

Column 6, line 49
"controller 48. In operation, only one of the wireless receiver" should read --controller 48. In operation, only one of the wireless transceiver--.

Column 7, line 19
"(not shown herein) that is plugged into 132. By having that" should read --(not shown herein) that is plugged into the connector 132. By having that--.

Column 7, line 44
"memory 104, the wireless transmitter 106, as well as to a" should read --memory 104, the wireless transceiver 106, as well as to a--.

Column 7, line 48
"for operating the wired transmitter 110 and the LED 118." should read --for operating the wired transceiver 110 and the LED 118.--.

Column 9, line 27
"memory 204, the wireless transmitter 206, as well as to an" should read --memory 204, the wireless transceiver 206, as well as to an--.

Column 9, line 31
"provide the power for operating the wired transmitter 210 and" should read --provide the power for operating the wired transceiver 210 and--.

Column 11, line 4
"264, and MACRO C program 266 are located in a descending" should read --264, and MACRO C button 266 are located in a descending--.

Column 13, line 51
"sep 342, whereupon the display 66 (also shown in FIG. 5) will" should read --step 342, whereupon the display 66 (also shown in FIG. 5) will--.

Column 14, line 43
"in an any other key pressed determination 368. It any other" should read --in an any other key pressed determination 368. If any other--.

Column 18, line 3
"system and method being able to programsuch" should read --system and method being able to program such--.

In the claims

Column 18, line 55
"to cause said plow controller to provide electrical" should read --to cause said plow controller to provide the electrical--.

Column 20, line 50
"enable a user of said remote control to program said plurality" should read --enable the user of said remote control to program said plurality--.

Column 20, line 56
"enable a user of said remote control to program more than one" should read --enable the user of said remote control to program more than one--.

Column 21, line 18
"to control a spreader; and" should read --to control the spreader; and--.

Column 21, line 58
"a spreader controller for providing electrical signals to a the" should read --a spreader controller for providing electrical signals to a--.